(12) United States Patent
Preiss

(10) Patent No.: US 11,780,755 B2
(45) Date of Patent: Oct. 10, 2023

(54) VORTEX FLOW INDUCER AND OZONE DISSOLUTION CHAMBER HAVING THE SAME

(71) Applicant: Adrian A Preiss, Lithia, FL (US)

(72) Inventor: Adrian A Preiss, Lithia, FL (US)

( * ) Notice: Subject to any disclaimer, the term of this patent is extended or adjusted under 35 U.S.C. 154(b) by 112 days.

(21) Appl. No.: 17/458,645

(22) Filed: Aug. 27, 2021

(65) Prior Publication Data

US 2023/0060405 A1 Mar. 2, 2023

(51) Int. Cl.
  *C02F 1/78* (2023.01)
  *F15D 1/02* (2006.01)
  *B01F 23/232* (2022.01)
  *B01F 25/10* (2022.01)
  *B01F 101/00* (2022.01)

(52) U.S. Cl.
  CPC .............. *C02F 1/78* (2013.01); *B01F 23/232* (2022.01); *B01F 25/1041* (2022.01); *F15D 1/02* (2013.01); *B01F 2101/305* (2022.01); *C02F 2301/026* (2013.01); *C02F 2303/04* (2013.01)

(58) Field of Classification Search
  CPC ...... C02F 1/32; C02F 1/78; C02F 1/46; C02F 1/72; C02F 2201/003; C02F 1/30
  See application file for complete search history.

(56) References Cited

U.S. PATENT DOCUMENTS 5,865,995 A * 2/1999 Nelson .................. B01D 19/00
    96/216

* cited by examiner

*Primary Examiner* — Walter D. Griffin
*Assistant Examiner* — Cameron J Allen
(74) *Attorney, Agent, or Firm* — Lewellyn Law, PLLC; Stephen Lewellyn (57) ABSTRACT

A vortex flow inducer has inducer body with an interior end, an outer end and a length extending there between, and a longitudinal axis extending between the interior and the outer ends. A flow passage extends between the interior and outer ends of the inducer body. The flow passage has an inlet at the outer end and an exit at the interior end. The flow passage is swept laterally toward a side of the inducer body in a direction from the outer end toward the interior end such that the exit is laterally offset from the longitudinal axis. The interior end of the inducer body has a concave curvature. The swept flow passage and the curved interior end induce a vortex flow in a fluid flowing through the flow passage as it exits the flow passage and into a flow passage of a conduit the that extends at an angle relative to the longitudinal axis of the inducer body.

5 Claims, 7 Drawing Sheets

VORTEX FLOW INDUCER AND OZONE DISSOLUTION CHAMBER HAVING THE SAME

FIELD OF THE INVENTION

The present disclosure relates to inducing a rotational or vortex flow in a fluid flowing through a conduit and ozone dissolution chambers and, more particularly, to swirl inducer that is insertable into a conduit for inducing a rotational fluid flow and ozone dissolution chambers having the same.

BACKGROUND OF THE INVENTION

It is known to introduce ozone into water to eliminate contaminants, in particular bacterial contaminants. Ozone has been used as a chemical treatment to oxidize organic matter, metals, bacteria, and viruses in the water being treated. Dissolved ozone also forms an oxide coating on the surface of submerged metals, preventing corrosion. An ozone molecule is a rapid oxidizer that will oxidize organic matter quickly. Oxidized organics and metals can gain electrons and assume a positive attraction for other negatively charged particles, causing them to amalgamate, forming larger clumps easily removed by a filter.

In conventional ozone dissolution chambers, the ozone gas is applied at the base of a tall column. The ozone-oxygen bubbles float to the surface slowly, their upward movement slowed by the downward counter flow of the water stream. To achieve a sufficient contact time for the ozone to dissolve in the water before the water and ozone pass from the mixing column, the counter-current flow mechanism is combined with a contact column. The concentration of dissolved ozone-oxygen is undesirably diluted in the larger vertical columns. While ozone-oxygen contact in mixing chambers is generally effective, there is a need for improved mixing in more compact sized mixing vessels.

Several existing ozone dissolution chambers have been designed to impart or induce a rotational or vortex-like flow within the chamber to increase mixing and contact time. U.S. Pat. Nos. 8,980,085 and 10,000,396, the entirety of each is incorporated herein by reference, describe ozone dissolution chambers that use the principle of laminar stratification of gas in a turbulent dissolution chamber. The dissolution chambers are much shorter in height than the conventional tower dissolution chamber and ensures a high degree of dissolution of ozone in water and, consequently, a high degree of oxidation of organic and metal impurities to a final oxidation state.

There is also a need and a desire to increase laminar flow by reducing turbulent flow in dissolution chambers to reduce or eliminate the need to use ozone destruct units, which operate to safely destroy excess ozone in the fluid exiting the dissolution chamber.

SUMMARY OF THE INVENTION

Embodiments of the disclosure provide a vortex flow inducer for inducing a vortex flow in a fluid flow passage. The vortex flow inducer may be used in connection with the ozone dissolution chambers described in U.S. Pat. Nos. 8,980,085 and 10,000,396.

Embodiments of the disclosure provide a vortex flow inducer and ozone dissolution chamber, wherein the inducer is configured to induce a vortex fluid flow within the dissolution chamber.

Embodiments of the disclosure provide a vortex flow inducer that reduces turbulence in an ozone dissolution chamber resulting in faster dissolving of ozone gas (bubbles) in the fluid flowing in the dissolution chamber, which reduces or eliminates having to use an ozone destruct unit.

Embodiment of the disclosure provide a vortex flow inducer having an inducer body. The inducer body has an interior end, an outer end and a length extending there between, and a longitudinal axis extending between the interior and the outer ends. A flow passage extends between the interior and outer ends of the inducer body. The flow passage has an inlet at the outer end and an exit at the interior end. The flow passage is swept laterally toward a side of the inducer body in a direction from the outer end toward the interior end such that the exit is laterally offset from the longitudinal axis. The interior end of the inducer body has a concave curvature, and wherein the flow passage and the interior end are configured to induce a vortex flow in a fluid flowing through the flow passage as it exits the flow passage and into a flow passage of a conduit the that extends at an angle relative to the longitudinal axis of the inducer body.

In connection with an ozone dissolution chamber, the vortex flow reduces fluid turbulence in the dissolution chamber, thereby increasing dissolving ozone gas (bubbles) in the fluid flowing in the dissolution chamber, which reduces or eliminates having to use an ozone destruct unit.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
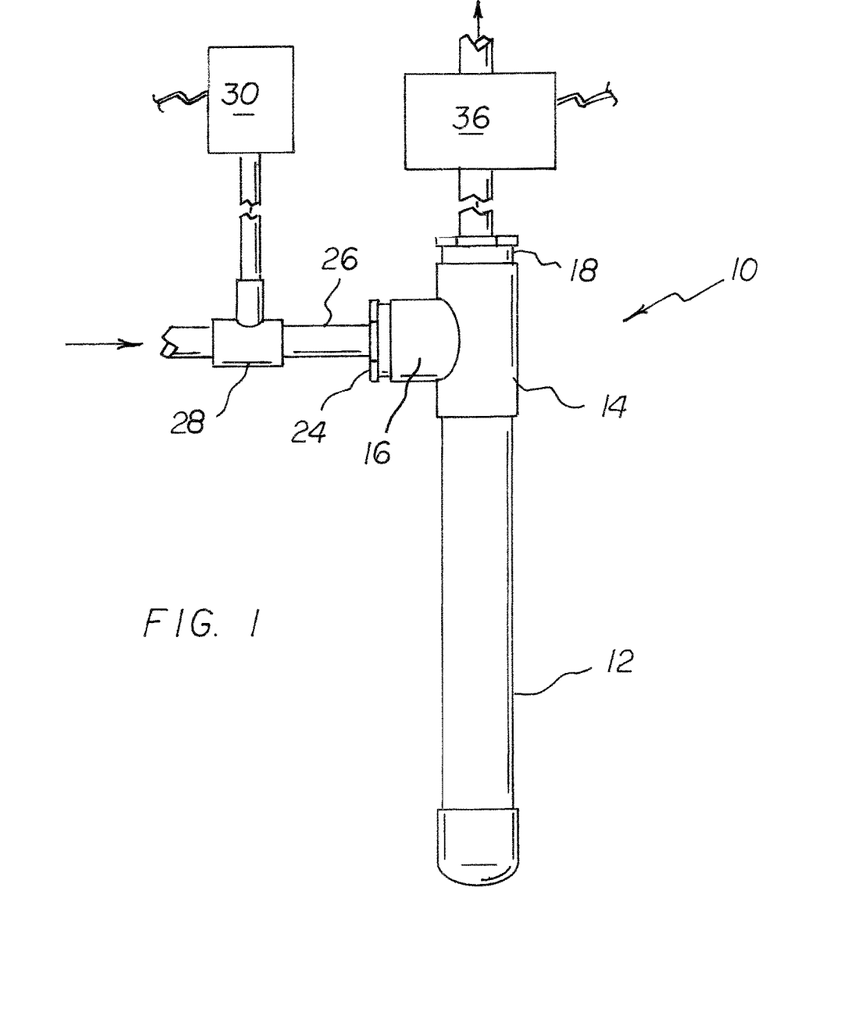
FIG. 1 is an elevational view of an ozone dissolution chamber constructed in accordance with the principles of the present disclosure.
Figure 2:
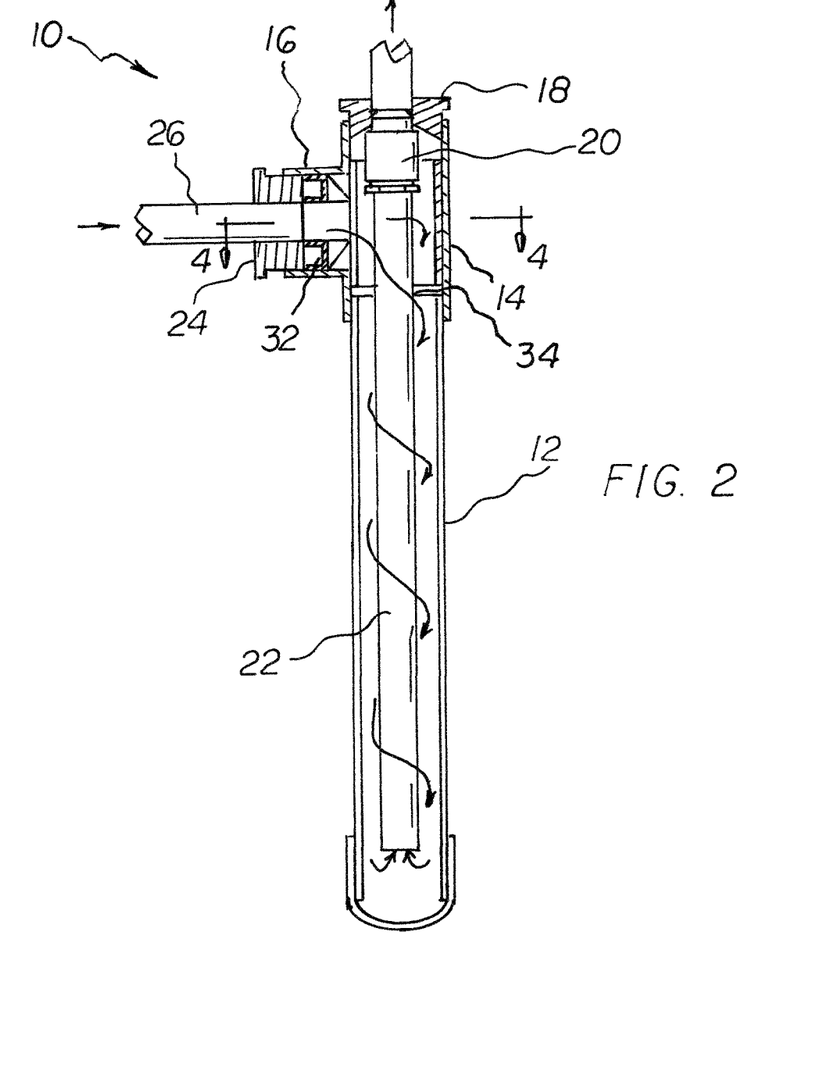
FIG. 2 is an elevational, cross-sectional view of the ozone dissolution chamber of FIG. 1.
Figure 3:
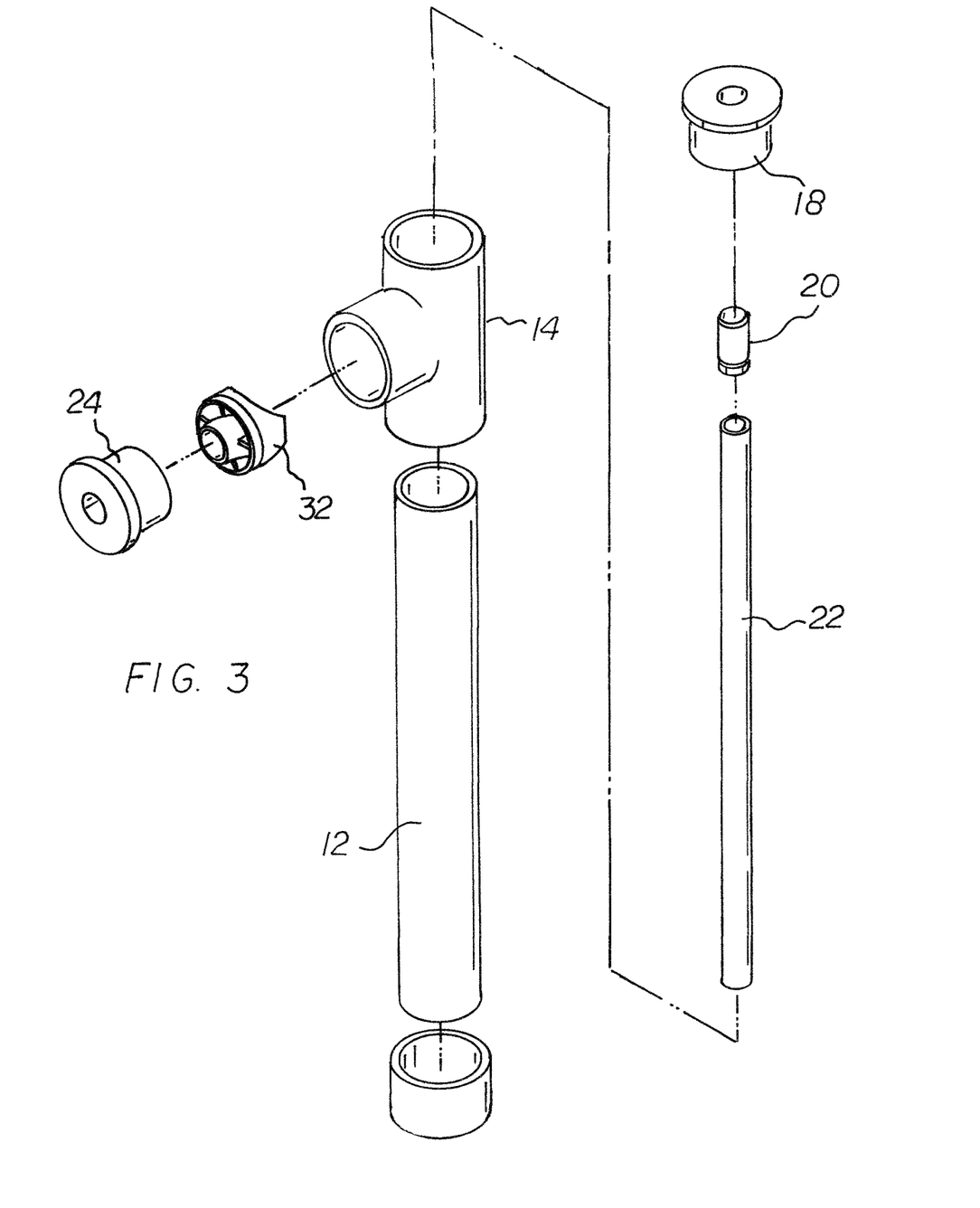
FIG. 3 is an exploded view of the ozone dissolution chamber of FIG. 1.

A dissolution chamber 10 as illustrated in FIGS. 1-3 comprises a plurality of components. First provided is a vertically disposed exterior tube 12 with an open upper end and a closed lower end. A T-shaped fitting 14 having an upper end, a lower end, a laterally extending leg 16, and a vertical throughput 18 is coupled to the upper end of the exterior tube 12. An apertured reducer 18 is coupled to the upper end of the T-shaped fitting 14. A short coupling 20 extends through the apertured upper reducer.

Provided next is a vertically disposed interior tube 22 having an open upper end, a open lower end, a length. The interior tube 22 is located within the exterior tube 12. The interior tube 22 and the exterior tube 12 have a common vertical central axis. The upper end of the interior tube 22 is adjacent to the upper end of the T-shaped fitting 14. The lower end of the interior tube is spaced above the lower end of the exterior tube. In an example, the length of the interior tube 22 and the length of the exterior tube 12 each may have a length of between 6 and 8 times the diameter of the exterior tube. The interior tube 22 may be from 25 percent to 50 percent of the diameter of the exterior tube 12. The interior and exterior tubes provide a fluid flow path downwardly between the interior and exterior tubes then upwardly through the interior tube.

An apertured reducer 24 is provided in the laterally extending leg 16 of the T-shaped fitting 14. A horizontally disposed input tube 26 has a distal end and a proximal end. The proximal end is located within the apertured reducer 24. The distal end of the input tube is adapted to be coupled to a source of water to be disinfected and sanitized and the distal end of the input tube is adapted to be coupled to a pump (not shown).

A T-shaped fitting 28 with a Venturi injector with an input end and an output end and a horizontal throughput is coupled to the input tube 26. The T-shaped fitting 28 has as upwardly extending leg. Operatively coupled to the upwardly extending leg of the T-shaped fitting 28 is an ozone generator 30 to add ozone to the water passing through the input tube to be cleaned.

A swirl or vortex flow inducer 32 is disposed within T-shaped fitting 16 and is configured to induce a vortex flow 34 in the fluid flowing through input tube and into the exterior tube 12, as explained in further detail below.

An electrolytic cell 36 is operatively coupled to the upper end of the interior tube 22 and is configured to add chlorine dioxide or chlorite to the fluid flowing therethrough.

Turning to FIGS. 4-9, the inducer 32 is configured to be disposed in the leg 16 of T-shaped fitting 14 and communicate fluid flowing through reducer 24 into the exterior pipe 12 through flow passage 38. The interior end 40 of the inducer 32 is curved and the curvature is configured to have a radius to match the radius of the interior wall 42 of the T-shaped fitting 14 so that the interior end conforms to the curvature of the interior wall of the T-shaped fitting. The outer end 44 of the inducer 32 is configured to couple with the reducer 24 to sealing connect therewith and direct fluid from the reducer into flow passage 38.

Figure 4:
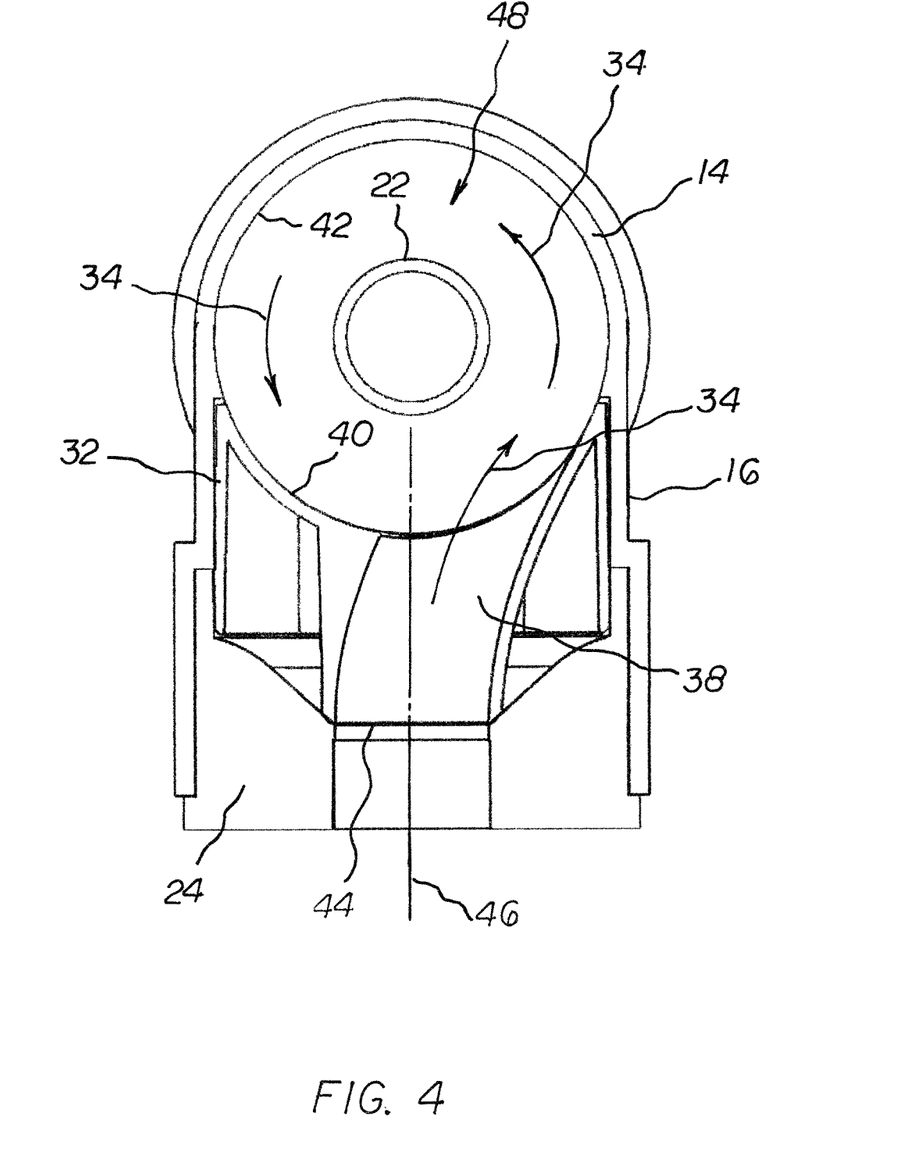
FIG. 4 is a cross-sectional view taken along line 4-4 in FIG. 2.
Figure 5:
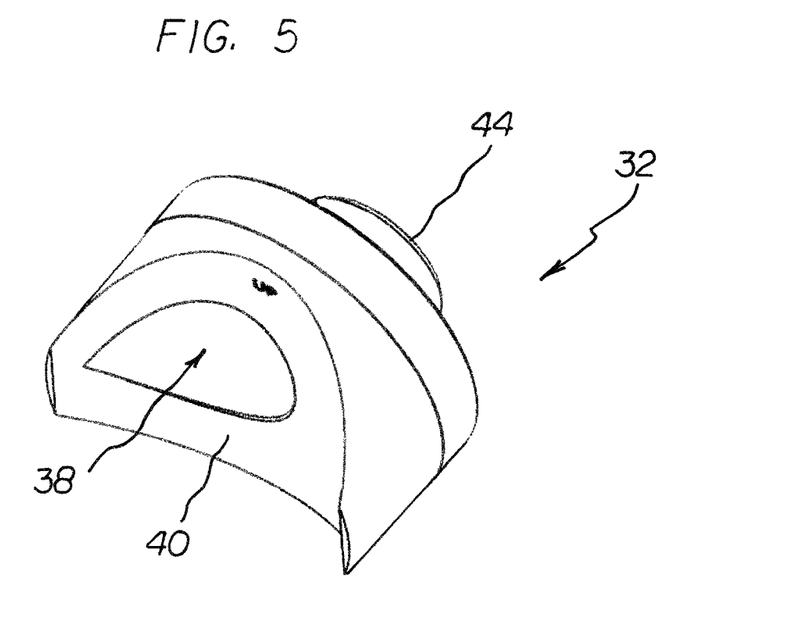
FIG. 5 is a first perspective view of a vortex flow inducer constructed in accordance with the principles of the present disclosure.
Figure 6:
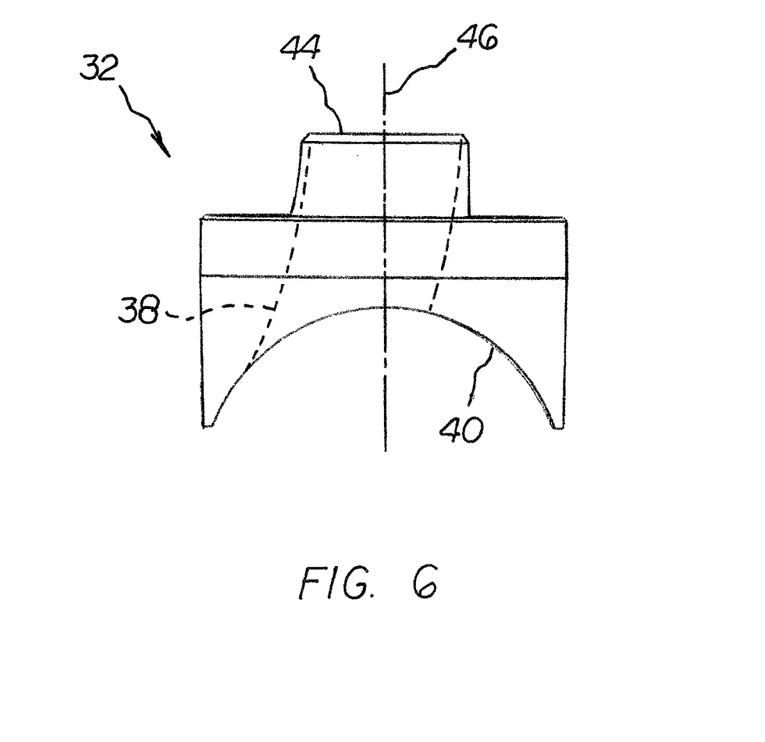
FIG. 6 is a top view of the vortex flow inducer of FIG. 5.
Figure 7:
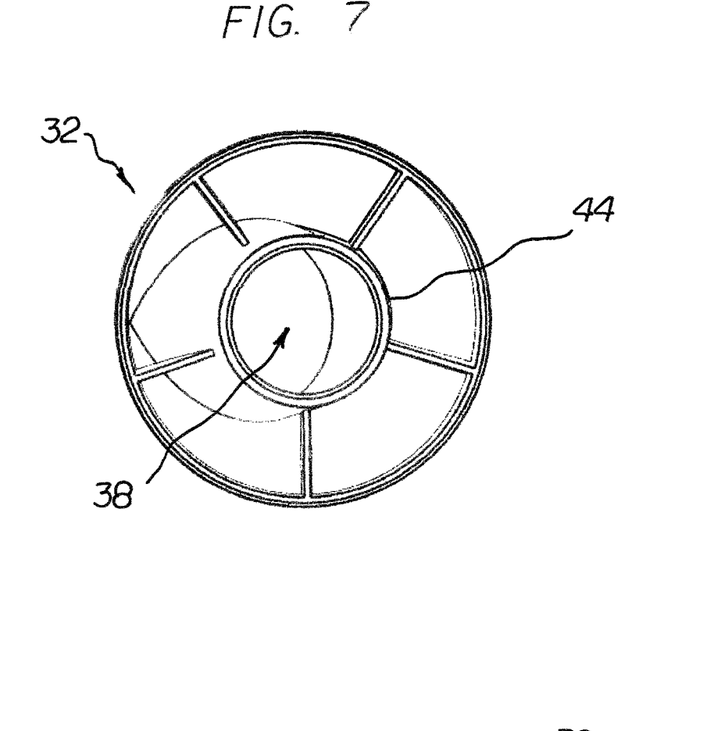
FIG. 7 is a second perspective view of the vortex flow inducer of FIG. 5.
Figure 8:
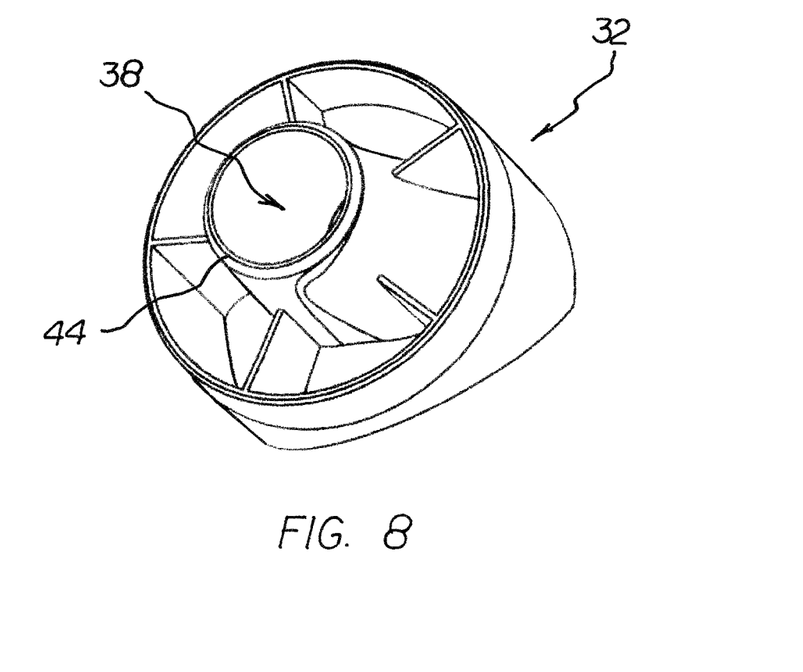
FIG. 8 is a third perspective view of the vortex flow inducer of FIG. 5.
Figure 9:
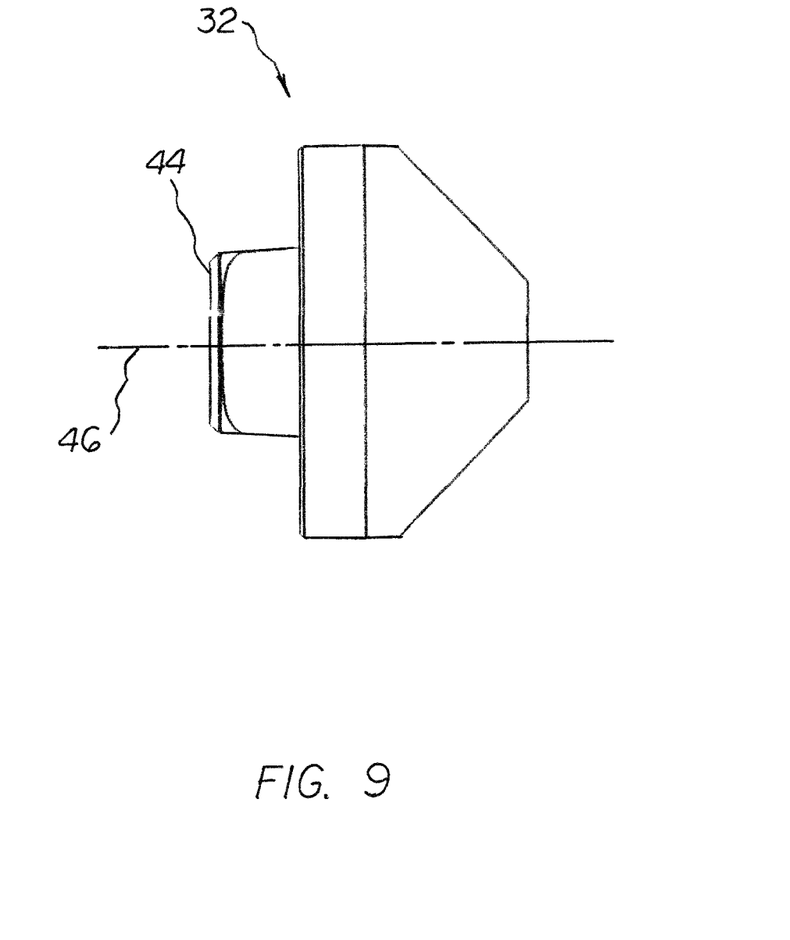
FIG. 9 is a side view of the vortex flow inducer of FIG. 5.

The flow passage 38 is laterally swept to be off center of the flow inducer central axis 46. Particularly, the flow passage 38 is swept to the right (as seen in FIG. 4) of axis 46 in a direction from end 44 toward end 40. The combination of the swept flow passage 38 and the curvature of end 40 induces a vortex flow 34 in the fluid exiting the flow passage and into the annular space 48 between the exterior pipe 12 and the interior pipe 22.

As best seen in FIG. 4, the flow passage 38 is configured such that its exit into the exterior pipe 12 is curved with a curvature that matches the curvature of the interior wall 42 of the fitting 14. The ensures a smooth transitional fluid flow from the inducer 32 through its passage 38 and induce the vortex flow 34 in the annual space as the fluid flows therethrough to the bottom of the interior pipe 22. This induced vortex flow increases contact time between the ozone and fluid in the dissolution chamber.

It should be noted the orientation of the inducer 32 as shown in FIGS. 4-9 is the correct orientation when the inducer is used in the northern hemisphere, wherein downwardly flowing water rotates in a clockwise direction due to the Coriolis effect to not operate against this natural phenomenon. In the southern hemisphere, the orientation of the inducer would be 180-degrees rotated about its axis.

While the foregoing description and drawings rep resent exemplary embodiments of the present disclosure, it will be understood that various additions, modifications, and substitutions may be made therein without departing from the spirit and scope and range of equivalents of the accompanying claims. It will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A vortex fluid flow inducer for inducing a vortex fluid flow within an ozone dissolution chamber having a fluid flow into the ozone dissolution chamber, the inducer comprising:
   an inducer body having a concaved-shaped interior end, an outer end and a length extending there between, the inducer body having a longitudinal axis extending between the interior and the outer ends, the concaved-shaped interior end curves inward toward the outer end;
   a flow passage defined by the inducer body, the flow passage extending along the length of the inducer body and through the concaved-shaped interior end and the outer end of the inducer body, the flow passage extending through the outer end provides an inlet to the flow passage at the outer end and the flow passage extending through the concaved-shaped interior end provides an exit of the flow passage at the concaved-shaped interior end, the flow passage being swept laterally toward a side of the inducer body in a direction from the outer end toward the concaved-shaped interior end such that the exit is laterally offset from the longitudinal axis; and
   wherein the flow passage and the concaved-shaped interior end are configured to induce a vortex flow in the fluid flow into the ozone dissolution chamber, thereby reducing turbulent flow in the ozone dissolution chamber and encouraging faster dissolving of ozone gas in the ozone dissolution chamber.

2. The inducer of claim 1, wherein the concave curvature is perpendicular to the longitudinal axis.

3. The inducer of claim 1, wherein the inducer body is configured to be disposed internally within a conduit or pipe fitting with the outer end being located upstream from the concaved-shaped interior end in relation to a direction of fluid flow in the conduit or pipe fitting, and with the exit opening into the dissolution chamber.

4. The inducer of claim 1, wherein the outer end of the inducer body is configured to connect to a pipe component having a pipe component flow passage to join the pipe component flow passage with the flow passage of the inducer body.

5. A ozone dissolution chamber system comprising, in combination:
   a vertically disposed exterior tube with an open upper end and a closed lower end and a T-shaped fitting coupled to the upper end of the exterior tube, the T-shaped fitting having a laterally extending leg;
   a vertically disposed interior tube with an open upper water exiting end and an open lower water entering end located within the exterior tube, the lower end of the interior tube being spaced above the lower end of the exterior tube;
   a horizontally disposed input tube having distal end and proximal ends, the proximal end coupled to the laterally extending leg; and
   a vortex fluid flow inducer disposed in the laterally extend leg of the T-shaped fitting, the vortex fluid flow inducer having an inducer body;
   the inducer body having a concaved-shaped interior end, an outer end and a length extending there between, the inducer body having a longitudinal axis extending between the interior and the outer ends, the concaved-shaped interior end curves inward toward the outer end;
   a flow passage defined by the inducer body, the flow passage extending along the length of the inducer body and through the concaved-shaped interior end and the outer end of the inducer body, the flow passage extending through the outer end provides an inlet to the flow passage at the outer end and the flow passage extending through the concaved-shaped interior end provides an exit of the flow passage at the concaved-shaped interior end, the flow passage being swept laterally toward a side of the inducer body in a direction from the outer end toward the concaved-shaped interior end such that the exit is laterally offset from the longitudinal axis;
   the concaved-shaped interior end of the inducer body conforms with the curvature of an inner wall of the T-shaped fitting; and
   wherein the flow passage and the concaved-shaped interior end are configured to induce a vortex flow in the fluid flow into the ozone dissolution chamber, thereby reducing turbulent flow in the ozone dissolution chamber and encouraging faster dissolving of ozone gas in the ozone dissolution chamber.

* * * * *